Patented Mar. 30, 1948

2,438,569

UNITED STATES PATENT OFFICE 2,438,569

PREPARATION OF AN ALUMINA-GROUP VI OXIDE CATALYST

William J. Mattox, La Grange, Ill., assignor to Universal Oil Products Company, Chicago, Ill., a corporation of Delaware No Drawing. Application November 29, 1944, Serial No. 565,812

10 Claims. (Cl. 252—257)

This application is a continuation-in-part of my co-pending application Serial No. 447,953 (abandoned), filed June 22, 1942, which in turn is a continuation-in-part of my copending application Serial No. 430,499, filed February 11, 1942, now U. S. Patent No. 2,395,058.

This invention relates to processes for the manufacture of composite catalysts useful in hydrocarbon conversion reactions involving generally dehydrogenations, dehydrocyclizations, hydrogenations and reforming of gasolines to increase their antiknock value.

More specifically, the invention is concerned with an improved process for manufacturing certain types of catalysts previously found useful for the types of conversion reactions mentioned wherein many of the steps previously used are eliminated and the process of manufacture is simplified and made less expensive.

The types of catalysts with which the present invention is concerned are composites in which alumina is used as a support for catalytically active oxides comprising those of the metals in the left-hand column of group VI of the periodic table and consisting of chromium, molybdenum, tungsten, and uranium. All of these alternatively utilizable catalytic materials may be used with varying degrees of effectiveness in such reactions as dehydrogenation of aliphatic hydrocarbons, such as paraffins and olefins to produce more unsaturated derivatives of similar structure, in the dehydrocyclization of aliphatics containing at least six carbon atoms in chain arrangement to produce aromatic hydrocarbons, in reforming processes wherein gasolines of inferior antiknock rating are treated in the presence or absence of hydrogen to increase their antiknock value without substantial consumption of hydrogen, and in hydrogenation reactions wherein an excess of hydrogen is used and unsaturated hydrocarbons are saturated with hydrogen without essential change in structure, or hydrocarbons are destructively hydrogenated.

The previously used methods for the preparation of these types of catalysts in which the more active constituent was supported by a less active refractory material, such as alumina, involved first the preparation of a granular or powdered alumina by the controlled calcination of a hydrated alumina either of a naturally occurring or a precipitated type, and the addition of the active catalytic oxides or metals by impregnating the alumina granules or powder with solutions of salts yielding catalytically active oxides on calcination, or the precipitation of hydrated oxides on the alumina by adding alkaline precipitants to solutions of salts in which the alumina was either precipitated or suspended. All of these methods involve a number of steps including various filtrations and washings to remove the undesirable components and these operations are frequently time-consuming and expensive. By the present process the manufacture of these catalysts is considerably simplified while maintaining the high activity of the prepared composites.

In one specific embodiment the present invention comprises a process for the manufacture of composite catalysts comprising alumina and at least one catalytically active oxide of the metals in the left-hand column of group VI of the periodic table, which comprises incorporating a compound of a metal in the left-hand column of group VI of the periodic table into hydrated aluminum sulfate heated to the point of fusion, heating the composite to form a solid residue, and subjecting the residue to treatment with a reducing gas.

In accordance with the invention, hydrated aluminum sulfate is heated to the point of fusion and the compound of a metal in the left-hand column of group VI of the periodic table is incorporated therein, or hydrated aluminum sulfate is heated to the point of fusion in the presence of a compound of a metal in the left-hand column of group VI of the periodic table. The hydrated sulfate of aluminum having the formula

$$Al_2(SO_4)_3 \cdot 18H_2O$$

is particularly serviceable since this compound melts at a temperature of 86.5° C. to form a fluid material into which salts yielding catalytically active oxides can be incorporated. Anhydrous aluminum sulfate melts with decomposition at 770° C. and therefore is not utilizable as such, but may be admixed with the proper amount of water to form the hydrate having the formula $Al_2(SO_4)_3 \cdot 18H_2O$.

The exact temperature to which the hydrated aluminum sulfate is to be heated to the point of fusion will depend upon whether the hydrated aluminum sulfate is heated to the point of fusion prior to the addition of the added compound or whether the heating is effected after the addition of the added compound. In general, this temperature will be within the range of about 100 to about 200° C., although it may be slightly higher in some cases.

Compounds of elements in the left-hand column of group VI of the periodic table, which are decomposable to the oxide by heating, or upon being reduced, for example, with hydrogen to yield catalytically active oxides, are admixed with the hydrated aluminum sulfate either before or after heating to the point of fusion. As examples of such compounds may be mentioned chromic acid, chromium trioxide, chromium sulfate, ammonium molybdate, molybdic acid, tungstic acid, ammonium tungstate, uranium sulfate, etc. It is understood that the above compounds may be used either in anhydrous condition or in their various hydrated forms.

It is a particular feature of the present invention that the compounds of the metals in the left-hand column of group VI of the periodic table are incorporated into the hydrated aluminum sulfate while the latter is in a fused condition. The term "incorporating" as used in the present specification and claims refers to the actual distribution of the added compound throughout the fused hydrated aluminum sulfate, as contrasted to merely combining or admixing the hydrated aluminum sulfate and added compound. As herein set forth, the combining may be done either before or after the hydrated aluminum sulfate is heated to the point of fusion, but incorporating the added compound into the hydrated aluminum sulfate is effected after the latter is heated to the point of fusion. In this way the added compound is distributed evenly and thoroughly throughout the hydrated aluminum sulfate and thereby produces a more active catalyst than is otherwise obtainable.

The fused hydrated aluminum sulfate and added compounds are thoroughly mixed and, in the next step of the process, are heated to drive off water to leave a solid residue and to effect varying degrees of decomposition of the added compounds. The temperature to which the various alternative mixtures must be heated to effect the dehydration will vary with the components and the proportions thereof but in general the temperature will be in the range of from about 150 to about 400° C.

The solid residue may comprise mixtures of aluminum sulfate and the oxide or other compounds of the added component, depending upon the ease of decomposition of the added compound. The solid residue is then treated with a reducing gas such as hydrogen or hydrogen-containing gases, carbon monoxide, or light hydrocarbon-containing gas mixtures at temperatures of from about 350 to about 650° C. until substantially all production of sulfur dioxide and/or hydrogen sulfide ceases, thereby forming aluminum oxide and decomposing the added component, all or in part, to the oxide thereof, the added component being distributed evenly and thoroughly throughout the aluminum oxide.

It is an important feature of the present invention that the aluminum sulfate is converted into the oxide by treatment with a reducing gas as hereinbefore set forth and not solely by heating. Excessively high temperatures, such as those of the order of about 800° C., are required in order to decompose aluminum sulfate to aluminum oxide. The use of such high temperatures has a detrimental effect upon the aluminum oxide and permanently impairs its catalytic activity. Such high temperatures are therefore to be avoided in any stage of preparing the catalyst, while the catalyst is being used in catalyzing the conversion reaction, or during regeneration thereof. This is a characteristic peculiar to aluminum sulfate and thereby differs from other salts of aluminum, such as the nitrate.

Another advantage to the present process is that highly active catalysts are produced without the necessity of using a precipitating agent as is now commonly used in the preparation of many of the known catalysts. The aluminum sulfate is converted to the oxide by treatment with the reducing gas under the conditions of operation hereinbefore set forth, while the other added compound or compounds is distributed throughout the aluminum sulfate and converted to the oxide during the various heating steps of the process. Thus, the added cost of precipitating agents is avoided and the time and expense otherwise required for removing the precipitating agent from the catalyst is avoided.

The finally prepared composite materials may then be used as catalysts in the form of granules or powder or they may be pelleted or extruded to form particles of regular size and shape for use in any of the various types of hydrocarbon conversion reactions mentioned. Catalysts prepared by the present process are utilizable in any type of operation in which catalysts of similar composition and prepared by older methods are used. Thus, the catalysts may be used in the so-called stationary bed type of operation in the form of granules, pellets, or extruded particles, or they may be used as powders in the so-called fluidized catalyst processes in which the vapors of hydrocarbons to be subjected to catalytic conversion are introduced to a reactor containing powdered catalyst and pass upwardly therethrough carrying a certain amount of the catalyst out of the reactor and into succeeding separators from which the spent catalyst is gravitated downwardly through regenerators against streams of oxidizing gases and ultimately returned to the fluid reactor.

The following examples are given to illustrate the preparation and use of catalysts in accordance with the present invention, although it is not intended that the scope of the invention be unduly limited on account of reference to such specific examples.

*Example I*

A fused mixture consisting of 500 grams of $Al_2(SO_4)_3 \cdot 18H_2O$, 562 grams of ammonium molybdate and 225 cc. of water was formed by heating in a porcelain dish. After thorough mixing, the fused mixture was heated to a temperature of 300° C. for six hours to produce a solid cake. The cake was ground to pass a 30 mesh sieve and then was formed into ⅛" pellets using 4% of "Sterotex" as a lubricant. The pills were then contacted slowly with hydrogen at 550° C. until no further sulfur dioxide or hydrogen sulfide was evolved.

The above catalyst was utilized in the hydroforming of a 36.5 A. S. T. M. octane number 200–400° F. Mid-Continent naphtha at 525° C., 100 pounds pressure, using 4 moles of added hydrogen per average mole of naphtha, an hourly liquid space velocity of 1, and a process period of 6 hours. A hydroformed gasoline having an octane number of 75.8 was obtained. The carbon deposit on the catalyst amounted only to 0.26 percent by weight of the charge.

*Example II*

A fused mixture consisting of 1000 grams of $Al_2(SO_4)_3 \cdot 18H_2O$, 20.9 grams of ammonium molybdate and 400 cc. of water was formed. The fused mixture was then heated until a solid residue remained. The residue was treated with hydrogen at 450–550° C. for a period of 24 hours and finally at 600° C. for 4 hours. Subsequently the material was formed into ⅛" pellets.

In a hydroforming test under the same conditions set forth in Example I, but using an hourly liquid space velocity of 0.75, a hydroformate product having an A. S. T. M. octane number of 76.9 was obtained, while the carbon deposit on the catalyst amounted to only 0.40 percent by weight of the charge.

*Example III*

The catalyst may be prepared by forming a fused mixture consisting of 440 parts by weight of hydrated aluminum sulfate, 15.8 parts by weight of chromium trioxide and 160 cc. of water. The fused mixture may then be heated to a temperature of 300° C. to produce a solid residue, which on cooling may be ground to pass through a 30 mesh standard screen and then contacted with hydrogen at 550° C. until sulfur dioxide and hydrogen sulfide are no longer evolved. The catalyst may consist of 88 percent by weight of aluminum oxide and 12 percent by weight of chromium sesquioxide.

The catalyst so prepared may be used for the dehydrogenation of normal butane at a temperature of 550° C., substantially atmospheric pressure, and an hourly gaseous space velocity of 1000. By separating butenes from the products and recycling unconverted butanes, an ultimate yield of 75 percent by weight of butenes may be produced.

I claim as my invention:

1. A process for manufacturing a composite catalyst which comprises incorporating a compound of a metal in the left-hand column of group VI of the periodic table into fused hydrated aluminum sulfate, heating the composite sufficiently to form a solid residue, and subjecting the residue to treatment with a reducing gas at a temperature of from about 350° C. to about 650° C. until there is substantially no evolution of sulfur dioxide or hydrogen sulfide.

2. The process of claim 1 further characterized in that said hydrated aluminum sulfate is heated to the point of fusion prior to combining with said compound of a metal.

3. The process of claim 1 further characterized in that said hydrated aluminum sulfate is heated to the point of fusion subsequent to combining with said compound of a metal.

4. A process for manufacturing a composite aluminum oxide-chromium oxide catalyst, which comprises incorporating a compound of chromium capable of yielding the oxide into fused hydrated aluminum sulfate, heating the composite to form a solid residue, and subjecting the solid residue to treatment with a hydrogen-containing gas.

5. A process for manufacturing a composite aluminum oxide-molybdenum oxide catalyst, which comprises incorporating a compound of molybdenum capable of yielding the oxide into fused hydrated aluminum sulfate, heating the composite sufficiently to form a solid residue, and subjecting the solid residue to treatment with a hydrogen-containing gas at a temperature of from about 350° C. to about 650° C. until there is substantially no evolution of sulfur dioxide or hydrogen sulfide.

6. A process for manufacturing a composite catalyst which comprises incorporating a compound of a metal in the left-hand column of group VI of the periodic table into fused hydrated aluminum sulfate, heating the composite at a temperature of from about 150 to about 400° C. to form a solid residue, and subjecting the solid residue to treatment with a hydrogen-containing gas at a temperature of from about 350 to about 650° until there is substantially no evolution of sulfur dioxide or hydrogen sulfide.

7. A process for the manufacture of a composite catalyst which comprises heating hydrated aluminum sulfate to the point of fusion, adding to the fused material a compound of chromium capable of yielding said chromium oxide, heating the composite to a temperature of from about 150 to about 400° C. to form a solid residue, and subjecting the solid residue to contact with a hydrogen-containing gas at a temperature of from about 350 to about 650° C. until there is substantially no evolution to sulfur dioxide or hydrogen sulfide.

8. A process for manufacturing a composite aluminum oxide-chromium sesquioxide catalyst, which comprises heating hydrated aluminum sulfate to the point of fusion in the presence of a compound of chromium capable of yielding said chromium oxide, heating the composite to a temperature of from about 150 to about 400° C. to form a solid residue, and subjecting the solid residue to contact with a hydrogen-containing gas at a temperature of from about 350 to about 650° C. until there is substantially no further evolution of sulfur dioxide or hydrogen sulfide.

9. A process for the manufacture of a composite catalyst which comprises heating hydrated aluminum sulfate to the point of fusion, adding to the fused material a compound of molybdenum capable of yielding said molybdenum oxide, heating at a temperature of from about 150 to about 400° C. to form a solid residue, and subjecting the solid residue to contact with a hydrogen-containing gas at a temperature of from about 350 to about 650° C. until there is substantially no evolution of sulfur dioxide or hydrogen sulfide.

10. A process for manufacturing a composite aluminum oxide-molybdenum oxide catalyst which comprises heating hydrated aluminum sulfate to the point of fusion in the presence of a compound of molybdenum capable of yielding said molybdenum oxide, heating the composite to a temperature of from about 150 to about 400° C. to form a solid residue, and subjecting the solid residue to contact with a hydrogen-containing gas at a temperature of from about 350 to about 650° C. until there is substantially no further evolution of sulfur dioxide or hydrogen sulfide.

WILLIAM J. MATTOX.

REFERENCES CITED

The following references are of record in the file of this patent:

UNITED STATES PATENTS

| Number | Name | Date |
| --- | --- | --- |
| 1,271,013 | Bosch et al. | July 2, 1918 |
| 1,399,807 | Scott | Dec. 13, 1921 |
| 1,844,963 | Larson | Feb. 16, 1932 |
| 1,889,672 | Larson | Nov. 29, 1932 |
| 1,913,940 | Mittasch et al. | June 13, 1933 |
| 2,002,997 | Herold et al. | May 28, 1935 |
| 2,077,421 | Lazier | Apr. 20, 1937 |
| 2,091,800 | Adkins et al. | Aug. 31, 1937 |
| 2,115,336 | Krauch et al. | Apr. 26, 1938 |
| 2,122,788 | Tropsch | July 5, 1938 |
| 2,201,235 | Lenth et al. | May 21, 1940 |
| 2,242,627 | Strickland | May 20, 1941 |
| 2,307,715 | Turkevich | Jan. 5, 1943 |

FOREIGN PATENTS

| Number | Country | Date |
| --- | --- | --- |
| 273,735 | Great Britain | Oct. 30, 1928 |